United States Patent [19]

Meadows

[11] 4,175,858
[45] Nov. 27, 1979

[54] FILM DUPLICATOR
[75] Inventor: John W. Meadows, Los Altos, Calif.
[73] Assignee: Quantor Corporation, Mountain View, Calif.
[21] Appl. No.: 897,080
[22] Filed: Apr. 17, 1978
[51] Int. Cl.$^2$ ............................................. G03B 27/04
[52] U.S. Cl. ...................................... 355/99; 355/29; 355/75
[58] Field of Search .................... 355/29, 75, 97, 99, 355/102, 113, 93

[56] References Cited
U.S. PATENT DOCUMENTS

| | | | |
|---|---|---|---|
| 3,644,039 | 2/1972 | Boyer | 355/93 |
| 3,817,618 | 6/1974 | Riley et al. | 355/97 X |
| 4,056,321 | 11/1977 | Grensike et al. | 355/29 X |
| 4,106,871 | 8/1978 | Roberts | 355/99 |

*Primary Examiner*—Richard A. Wintercorn
*Attorney, Agent, or Firm*—J. T. Cavender; Wilbert Hawk, Jr; George J. Muckenthaler

[57] ABSTRACT

A duplicator for making copies of a microfiche master. The master is positioned at an exposure station and a supply of copy film stored on a roll is incrementally advanced by a film drive located between the supply and the exposure station. During exposure the copy film is biased against the master by an overlying cover. Cutoff blades located immediately downstream of the exposure station sever each exposed segment of film after it is advanced past the exposure station. A single motor is used to sequentially advance, sever, and bias the film. The motor drives a rotatable element. A Geneva drive coupled to the rotatable element actuates the film drive; cam surfaces on the rotatable element displace a cam follower, the displacement of which is transmitted to a rotatable actuator element. The actuator element engages the film biasing cover and the cutoff blade. A tension roller between the roll of film and the film drive maintains the film taut, and upon advancement releases and reengages a brake to allow film to be unwound from the roll. The master is held at the exposure station on a transparent platen, and registered with respect to the platen by a retaining strip overlying an edge of the platen.

20 Claims, 14 Drawing Figures

FILM DUPLICATOR

BACKGROUND OF THE INVENTION

The present invention relates to film duplicators, particularly those of the kind for making copies of a microfiche master.

The prior art discloses a variety of film duplicators. Although the details differ, such duplicators generally provide that the master be positioned and held at an exposure station, and that copy film, normally from a roll, be incrementally advanced past the exposure station for contact printing. A segment of copy film at the exposure station is typically biased into intimate contact with the master, and light is directed through the master onto the copy film to reproduce the image of the master on the copy film. After exposure, the copy film is advanced to bring a fresh segment to the exposure station.

Many prior art duplicators accumulate exposed copy film segments until the desired number of copies has been made, at which point the exposed film is processed and cut into individual segments. However, such an operating philosophy may involve substantial delays and may further make it impossible to detect malfunctioning until a whole batch has been exposed and processed.

An improvement is disclosed by the commonly owned U.S. Pat. No. 3,958,142, wherein each copy is available for processing as soon as it has been exposed. Advancement means is disposed between the film storage and the exposure station for incrementally advancing a length of copy film equal to the length of the master. Actuation of the advancing means pushes the exposed section downstream, where cutoff means immediately downstream of the exposure station severs the exposed section, making it available for processing. Separate motors are provided for operating the film advancement means, the film biasing means and the cutoff means. The stepping motors sequentially energized in the proper sequence to insure, for example, that the film is not severed until it has been advanced completely.

Although the copies represented a substantial improvement the multiple stepper motors employed by it represent a substantial expense and a source for potential failure.

SUMMARY OF THE INVENTION

The present invention provides a microfiche duplicator wherein successive exposed segments are immediately severed and processed, but eliminates the need for multiple stepper motors. This reduces the cost and complexity of the unit, and simplifies the necessary electronic control.

Broadly, the present invention retains the favorable configuration of film transport means between the supply and the exposure station, and cutoff means immediately downstream of the exposure station, and uses a single motor to effect the transport, biasing, and cutoff operations. The motor drives a rotatable element, and the rotation of the rotatable element couples to the transport, biasing, and cutoff means during different portions of the rotatable element's rotation.

The film transport is preferably accomplished by opposed rollers biased toward one another and capturing the film therebetween. A Geneva drive transmits rotation of the rotatable element to one of the rollers during a portion of the rotatable element's rotation. The drive includes a star wheel and a pin on the rotatable element engageable to drive the star wheel during a portion of the rotatable element's rotation. The star wheel is geared to the roller.

Film biasing at the exposure station is preferably accomplished by an overlying cover having a resilient pad mounted thereto. The cover is movable towards the film such that the pad contacts the film and biases it against the master. Cutoff means preferably includes a movable blade that cooperates with a stationary blade to sever film located between the blades. Cam surfaces on the rotatable element engage a cam follower, motion of which is transmitted by an arm to a rotatable actuator element. Movement of this actuator element engages the relatively movable blades to effect cutoff, and moves the cover toward the film, but not so that the pad contacts the film. Further movement of the actuator element causes the movable blade to continue its travel (to no further effect), and moves the cover so that the pad contacts the copy film, thereby biasing it against the master.

The film supply is normally wound in the form of a roll. One aspect of the invention provides improved means for unwinding the proper length of film from the roll when the film advance roller is actuated. A tension roller between the roll of film and the advancement roller maintains the film taut. The roll of film is carried on a rotatable shaft, the shaft being provided with a brake whose engagement depends on the position of the tension roller. When film is advanced, the tension roller is pulled upward, releasing the brake. When advancement stops, the weight of the tension roller causes a length of film to be unwound from the roll until the downward motion of the tension roller causes the brake to be reapplied. An optical sensor is provided for detecting motion of the tension roller beyond certain limits, which motion indicates that the end of the roll has been reached. At the end of the roll, motion above a maximum or below a minimum occurs, depending on whether the end of the film remains attached to or comes free from the shaft.

Another aspect of the invention provides an improved platen arrangement for holding the master in precise registration at the exposure station. A movable carriage has a transparent platen mounted thereto, the carriage being movable between a position where the platen is at the exposure staton and a position where the platen is remote from the exposure station to allow an operator to replace the master. Means for detecting and maintaining the proper positioning of the platen at the exposure station incudes optical detection means for sensing proper location of the carriage (and hence the platen), and a solenoid operable to drive its plunger to engage and immobilize the carriage.

Means is also provided to hold the master in proper registration with the platen. According to this aspect of the invention, a flat retaining strip overlies an edge of the platen and is biased toward the platen to clamp an edge of the master. A ramp block carried by the carriage and coupled to the sheet cooperates with a roller mounted to the fixed structure of the duplicator. When the carriage is moved so that the platen is near its fully retracted position, the ramp block rides up on the roller and urges the retaining strip away from the platen to allow withdrawal and/or insertion of the master.

Other objects, features, and advantages of the present invention will become apparent after a reading of the remainder of this specification and the attached drawings.

BRIEF DESCRIPTION OF THE DRAWINGS

FIG. 7b is a side elevational view of the mechanism of FIG. 7a;

DESCRIPTION OF THE PREFERRED EMBODIMENT

Figure 1:
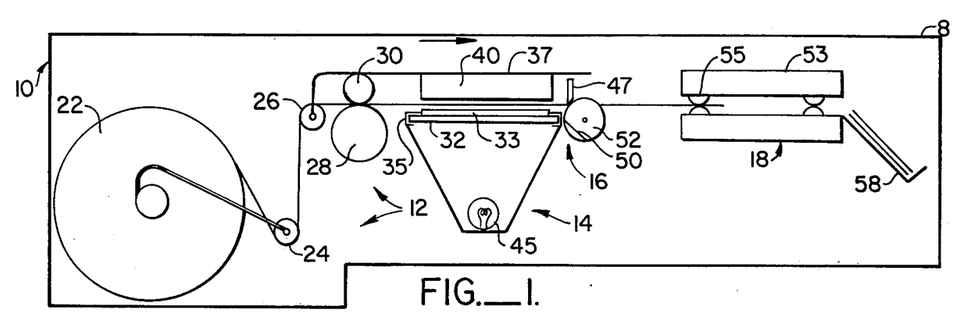
FIG. 1 is a schematic, side elevational view of the microfiche duplicator constructed in accordance with the present invention.
Figures 2, 3A, 3B:
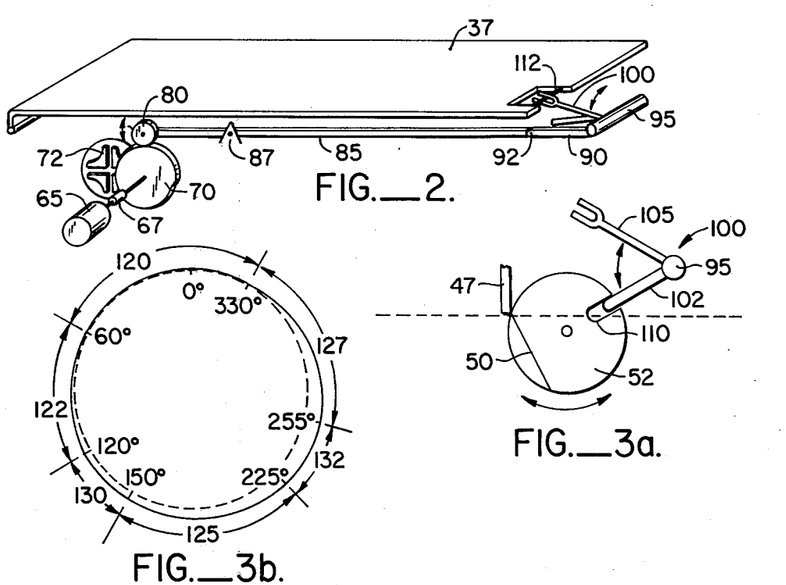
FIG. 2 is a schematic, perspective view showing how the rotational motion of a single motor is used to advance, sever, and bias the copy film.
FIG. 3a is a schematic, fragmentary view of the actuator element that drives the biasing and cutoff means of the present invention.
FIG. 3b is a schematic view of the cam configuration.

Turning now to the drawings, the overall configuration of a microfiche duplicator constructed in accordance with the present invention is seen by reference to FIGS. 1 and 2. The duplicator generally comprises a frame 8 mounting in serial fashion a film supply 10, a film advancement mechanism 12, a film exposure station 14, a film cutoff mechanism 16, and a film processing station 18.

Film supply 10 generally comprises a roll 22 of suitable copy film. Copy film from roll 22 is passed under a tension roller 24, over a deflection roller 26, and between opposed rollers 28 and 30 to exposure station 14. Movement of roller 28 causes film to be transported.

Actual duplication occurs at exposure station 14. A transparent platen 32 carries a microfiche master 33 and registers it at exposure station 14. Guides 35 are provided to allow the platen to be moved into registration at exposure station 14, or as shown in FIG. 2, to be moved away from the exposure station to allow an operator to remove and replace the master. A hinged cover 37 overlies the exposure station 14, and carries a resilient pad 40 adapted to contact the overlying copy film. Exposure station 14 is provided with a lamp 45 which may be of any suitable design. A particular configuration of a pulsed gas discharge lamp having an electrically conductive, infrared absorbing liquid jacket is described in the above referenced U.S. Pat. No. 3,958,142.

Cutoff mechanism 16, disposed immediately downstream of exposure station 14, comprises a stationary blade 47 and a cooperating movable blade 50. Blade 50 is mounted to a carrier 52, rotation of which causes blade 50 to move into operative engagement with blade 47 and sever a segment of film disposed between the blades.

Processing station 18 is disposed downstream from cutoff mechanism 16 at a distance less than the length of one microfiche. Processing station 18 includes a processor 53 driven roller pairs 55 within processor 53, and hopper 58 downstream of processor 53. Processor 53 may be of any suitable design, but an especially advantageous configuration is set forth in the copending commonly owned United States Patent Application bearing Ser. No. 862,720 entitled "High Speed, Low Temperature & Pressure Diazo Processing Method & Apparatus".

Having set forth the main components of the duplicator, the general operation can be explained. During the printing, cover 37 is biased downwardly so that pad 40 bears against the copy film and biases it into intimate contact with master 33. Lamp 45 is then energized for the required length of time to expose the segment of copy film at exposure station 14. After exposure has occurred, cover 37 is raised, feed roller 28 is rotated to advance the film by a length of one microfiche in a downstream direction. After advancement, rotatable blade carrier 52 is rotated, thereby severing the just exposed film segment. Driven roller pairs 55 advance the severed, exposed segment into processor 53, and discharge the developed fiche into hopper 58. These steps are typically carried out under computer control (not illustrated), with an operator in attendance for cycle initiation and the like.

One aspect of the present invention is an improved mechanical linkage for sequentially biasing, releasing, advancing, and severing the film. This aspect of the invention is shown schematically in FIGS. 2, 3a and 3b, and in somewhat more detail in FIGS. 4 and 5. A motor 65 is connected by a coupling 67 to drive a rotatable element 70. Broadly, rotatable element 70 drives advance roller 28 via a Geneva drive defined by a star wheel 72, and a pin 75 on rotatable element 70. Rotatable element 70 has a raised portion 76 which is circular in outline with a cutaway section near pin 75.

Pin 75 is engageable to rotate star wheel 72 by 90° during a single 90° segment of the rotation of rotatable element 70. During the remainder of element 70's rotation, star wheel 75 is not driven, and is further prevented from rotating by raised portion 76 on element 70.

Star wheel 72 is mounted to a large gear 77 which meshes with a smaller gear 78. Gear 78 is mounted on a shaft 79, which shaft also carries film advance roller 28. The diameter of roller 28 is such that advancement of one full microfiche length occurs with slightly less than one full revolution of roller 28 (to prevent formation of flat spots on roller 28). The gear ratio between gears 77 and 78 is slightly less than 4:1 in order to provide this required rotation with a 90° rotation of star wheel 72.

Rotatable element 70 also has a peripheral cam surface adapted to displace a cam follower 80. Cam follower 80 is mounted to a rocker arm 85, pivoted at 87. The end of rocker arm 85 remote from cam follower 80 is pivotally connected to a pivot arm 90 at pivot point 92. Pivot arm 90 is mounted to a shaft 95, rotatable about its axis, which shaft also carries an actuator element 100. Actuator element 100 is coupled to biasing cover 37 and rotary blade 50 as will be set forth more fully below.

As can be seen in FIGS. 2 and 3a, actuator element 100 has a first generally downwardly depending arm 102, and a second slightly upwardly inclined arm 105.

Downwardly depending arm 102 extends into a correspondingly shaped recess 110 in blade carrier 52 so that rotation of shaft 95 with actuator element 100 thereon causes rotation of blade carrier 52. Upper inclined arm 105 is bifurcated at its end, with the bifurcations engaging a generally horizontal pin 112 on cover 37. Thus, rotation of shaft 95, carrying with it actuator element 100, causes movement of pin 112, and therewith cover 37. Note that a clockwise rotation of shaft 95 raises cover 37 and moves blade 50 clear of blade 47 while a counterclockwise rotation lowers cover 37 and moves blade 50 toward and past blade 52.

Figure 4:
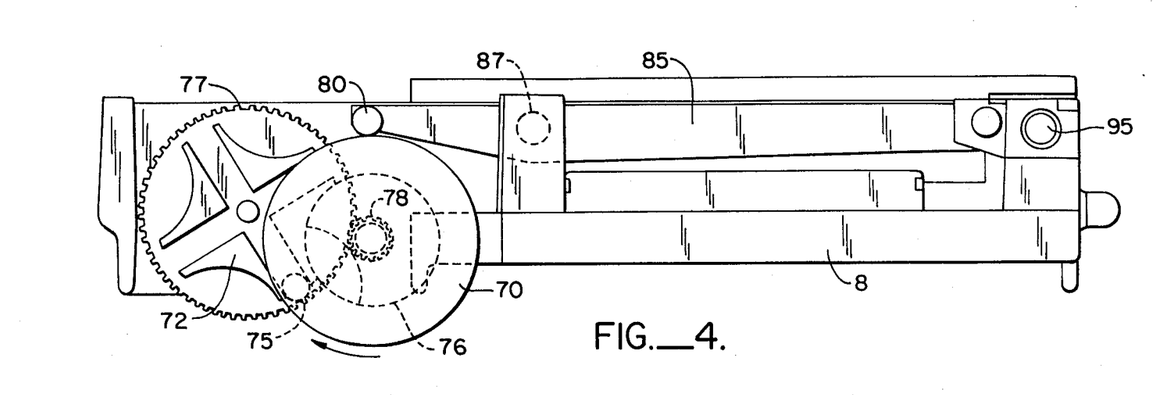
FIG. 4 is a simplified, elevational view showing the rotatable element and its associated Geneva drive and cam follower mechanisms for sequentially advancing, severing, and biasing the film.
Figure 5:
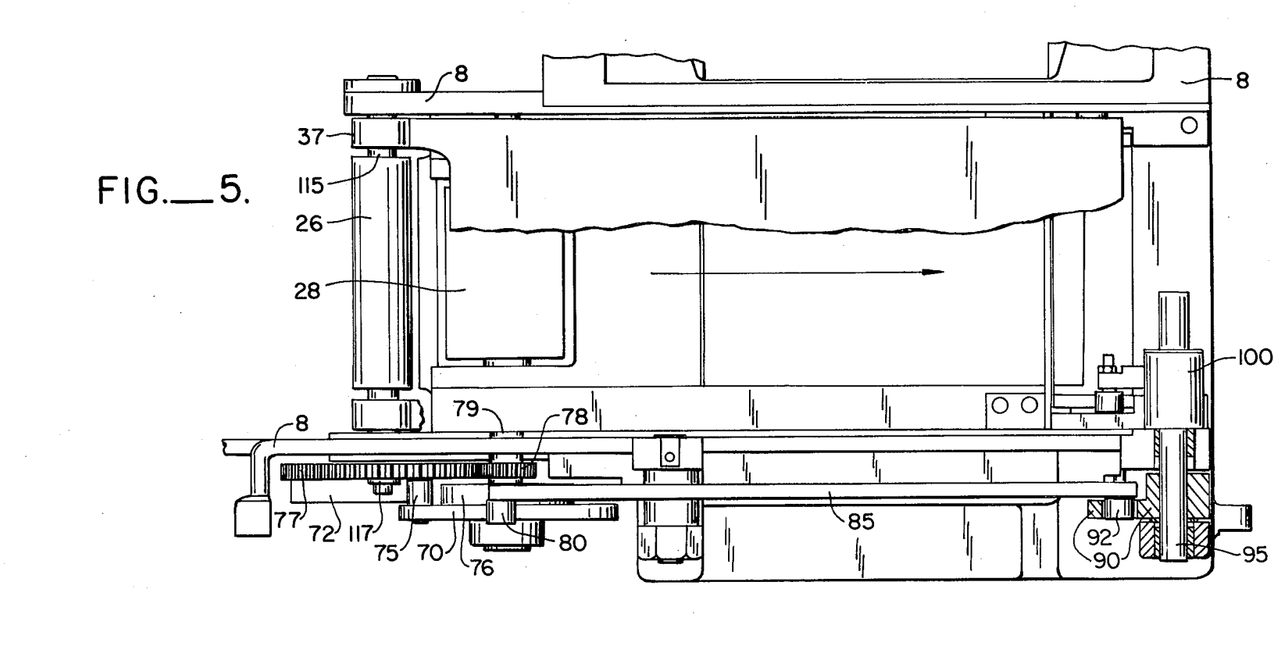
FIG. 5 is a simplified, top plan view of the mechanisms of FIG. 4.

Referring to FIGS. 4 and 5, the particular preferred alignment of the components discussed above can be seen. In particular, frame 8 carries a suitably mounted transverse shaft 115 which is journalled to and extends beyond frame 8 at one end to define a stub shaft 117. Deflection roller 26 and biasing cover 37 are independently mounted for rotation about shaft 115. Star wheel 72 (and gear 77) is mounted to stub shaft 117. Transverse shaft 79, which carries gear 78 and film advance roller 28 (rigidly affixed to one another) also carries rotatable element 70, free to rotate independently of gear 78 and roller 28.

It is clear that the sequence of operations discussed above depends on the particular configuration of the peripheral cam surface on rotatable element 70.

FIG. 3b illustrates a schematic outline of a cam suitable for use with the present invention, with the radial variations exaggerated for clarity. In practice, since the lever arm from pivot mounting 87 to pivot point 92 is long compared to that between cam follower 80 and pivot mounting 87, the actual displacements of cam follower 80 are small compared to the diameter of rotatable element 70.

For the sake of definiteness, particular angular positions will be designated. These are for illustration purposes only, and broad variations are possible. A first level cam surface 120 extends from 330° to 60°. In this context, a "level" cam surface is one defined by a constant radius. A second cam surface 122, defined by an increasing radius, extends from 60° to 120°. A third cam surface 125, defined by a further increasing radius, extends from 150° to 225°. A fourth cam surface 127, defined by a decreasing radius extends from 255° to 330°. Level cam surfaces 130 and 132 are provided between 120° and 150° and between 225° and 255°. The transition between all these cam surfaces is a smooth one. For example, cam surface 122 is defined by a radius which increases from the radius of level cam surface 120 to that of level cam surface 130.

The location of pin 75 is chosen so that pin 75 engages star wheel 72 during the rotation interval in which level cam surface 120 is in contact with cam follower 80.

Figure 6:
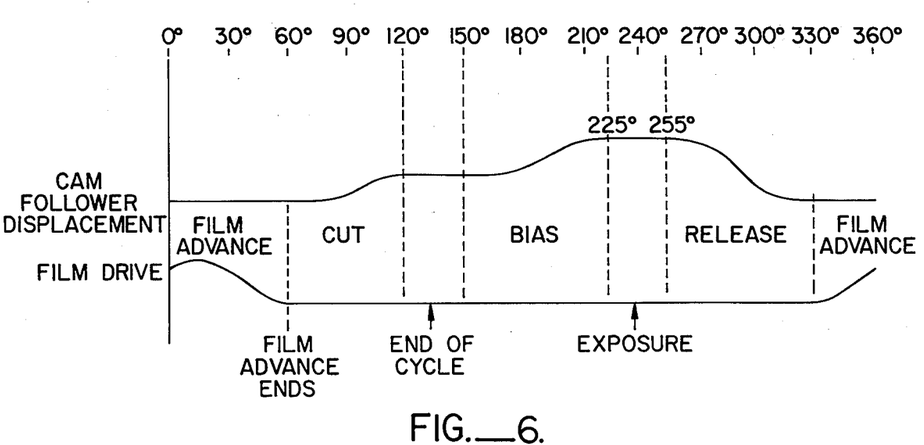
FIG. 6 is a plot showing the relative timing of film advance, cutoff, and biasing during a single rotation of the rotatable element of FIGS. 4 and 5.

FIG. 6 is a plot illustrating the general timing of operations in relation to the rotation of rotatable element 70.

The upper portion of the plot shows the displacement of cam follower 80 as a function of the angular orientation of rotatable element 70. This portion of the plot serves equally well as a plot of cam radius as a function of angle. It can be seen that cam follower 80 is at its lowest position as it contacts first cam surface 120 between 330° and 60°. During this 90° angular interval, pin 75 is engaged with star wheel 72 to advance the film, and actuator element 100 is at its uppermost position so that cover 37 is raised and blade 50 is not engaged with blade 47. Further rotation of rotatable element 70 from 60° to 120° results in an upward displacement of cam follower 80 as it rides over a second cam surface 122. This movement is transmitted to actuator 100 which lowers cover 37 part way, and engages blade 52 with stationary blade 47 to effect cutoff. At this point (120°) the copy film is not biased against the master, so it is possible for the platen to be removed from the exposure station and the master replaced as will be discussed more fully below. No change occurs between 120° and 150° as cam follower 80 contacts level cam surface 130.

Between 150° and 225°, cam follower 80 rides up on third cam surface 125, causing blade 52 to move past its cutting position (to no further effect), and biasing cover 37 against the copy film. Between 225° and 330°, cam follower 80 rides down to its lowest position as it contacts fourth cam surface 127, thereby lifting cover 37 and moving blade 52 away from blade 47. At 330°, pin 75 again engages star wheel 72 for the next film advance.

The lower portion of the plot in FIG. 6 shows the film drive displacement as a function of angular displacement of rotatable element 70. It can be seen, and it is the nature of the Geneva drive, that the engagement is a gradual one at its extremities, with maximum coupling at the middle (i.e. when pin 75 is on a line between the centers of star wheel 72 and rotatable element 70.) Such a gradual engagement and disengagement of the film transport mechanism avoids undue stress on the film.

Figure 7A:
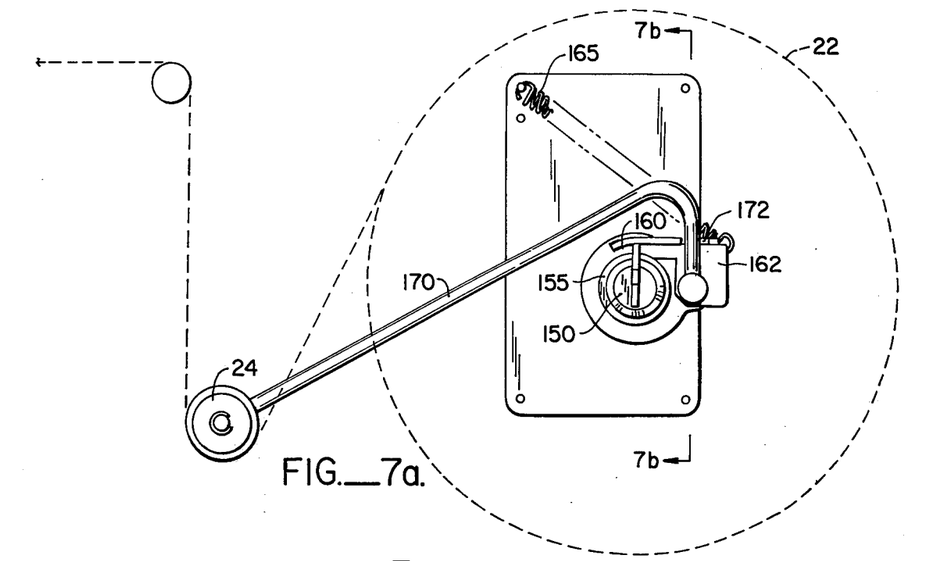
FIG. 7a is a front elevational view of a mechanism for releasing film from the roll in response to actuation of the film advance.
Figure 7B:
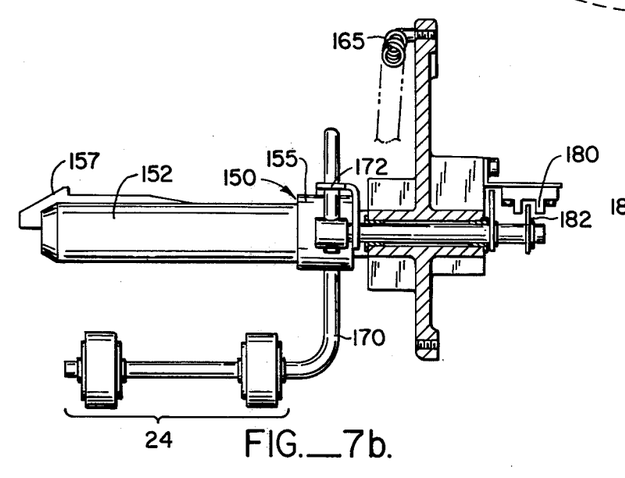
Figure 7C:
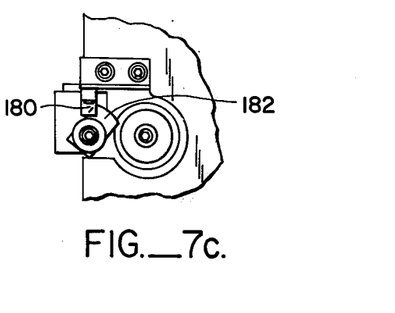
FIG. 7c is a fragmentary rear elevational view of the mechanism of FIG. 7a showing the elements for detecting the end of the roll of copy film.

Another aspect of the present invention provides an improved mechanism for unwinding the proper amount of film from roll 22 during and/or after each film advance cycle during which film advance roller 28 is activated. This aspect is best seen by reference to FIGS. 7a, 7b, and 7c. Film roll 22, shown in phantom in FIG. 7a is mounted on a shaft 150. Shaft 150 comprises a spindle 152, and a drum 155 coaxial with spindle 152. Spindle 152 is fitted with a latch 157 which serves to secure the roll of film which is normally supplied on a hub adapted to mate with spindle 152.

Shaft 150 is provided with a brake comprising a brake pad 160 which engages drum 155, and a bracket 162 that supports brake pad 160 and is pivotable about shaft 150. A tension spring 165 between racket 162 and the fixed structure supporting shaft 150 causes the brake to be engaged.

Tension roller 24, which may comprise a pair of spaced rollers, is supported by arm 170. Arm 170 extends through a slot 172 in bracket 162 to allow limited vertical movement of roller 24 without interacting with bracket 162. When the film is at rest, tension roller 24 is at the position shown, and spring 165 biases brake pad 160 into engagement with drum 155 of shaft 150. Upon activation of film advance roller 28, the motion of the film raises tension roller 24, and therewith arm 170. The arm rotates bracket 162 against the force of spring 165 to release the brake. Once the brake is released, and especially after the film advance is over, the weight of roller 24 causes fresh film to be unwound from roll 22. This occurs until brake pad 160 reengages drum 155 to prevent further rotation of shaft 150.

It is important to sense when the end of a roll of film has been reached to signal the operator to change film. Depending on the type of film, the end of the roll may or may not be attached to the hub. If the end of the roll is not free to come from the hub, tension roller 24 will assume a position higher than the maximum height during normal operation. If the end of the roll comes free of the hub, tension roller 24 will assume a position that is lower than the lowest position in the normal operating range. These excursions are sensed optically as can be seen best in FIGS. 7b and 7c. A photodetector 180 is mounted to the fixed structure, and is interrupted by a flag 182 affixed to shaft 150. During normal operation, flag 182 interrupts the light beam, but during an excursion to either extremity, the photodetector senses an uninterrupted beam which generates a signal to the controller and activates a warning light. It should readily be appreciated that this detection of extraordinary excursions of tension roller 24 also serves to flag abnormal operating conditions such as a break in the film, or a failure of brake pad at 160 to properly engage drum 155.

Figure 8A:
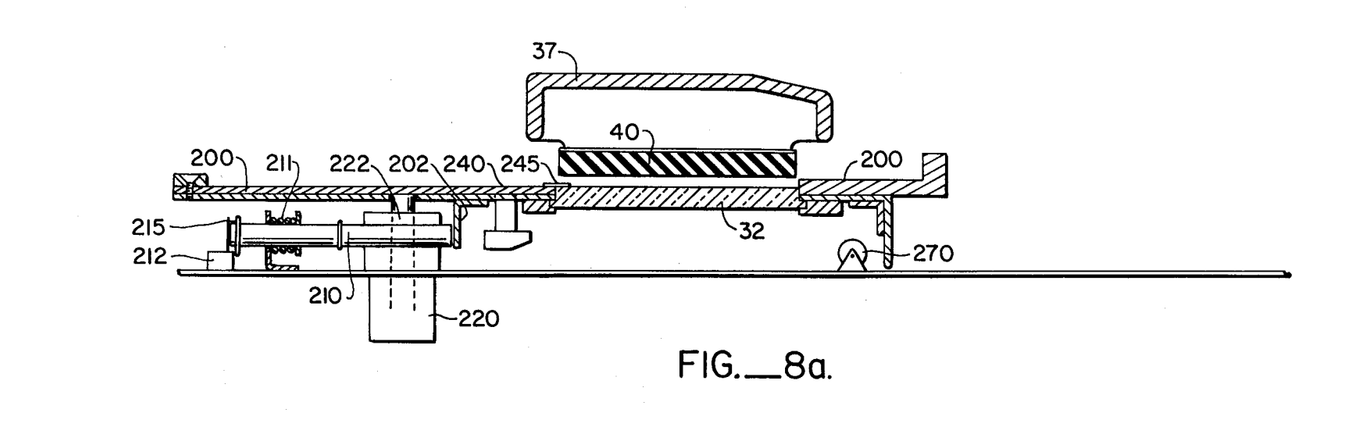
FIG. 8a is a simplified sectional view showing the carriage positioned with the platen at the exposure station.
Figure 8B:
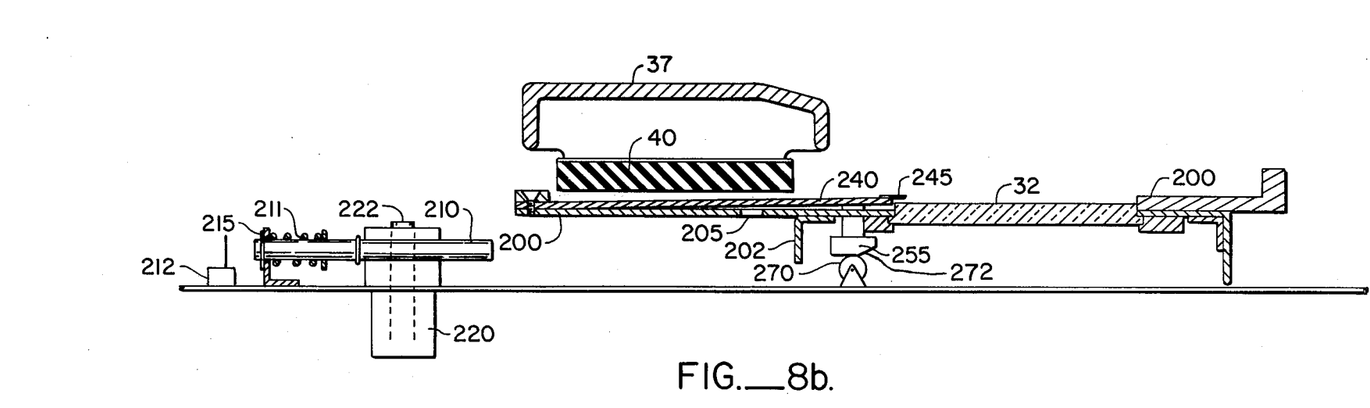
FIG. 8b is a simplified, sectional view showing the carriage positioned with the platen remote from the exposure station to allow replacement of the master fiche.

The above described features of the invention are concerned with getting a portion of copy film longitudinally registered with the exposure station. Another aspect of the present invention provides an improved platen arrangment for holding the master in precise registration at the exposure station. As can be seen in FIGS. 8a and 8b, a transparent platen 32 is mounted to a movable platen carriage 200. Platen carriage 200 has a downwardly depending member 202 and a downwardly facing recess 205. Plunger 210, biased by a spring 211, extends horizontally to engage downwardly depending member 202 as carriage 200 moves to a position where platen 32 is at the exposure station. Arrival of platen 32 at its proper position relative to exposure station 14 is sensed optically. A photodetector 212, mounted to the fixed structure, cooperates with a pin 215 mounted to plunger 210. A solenoid 220 is mounted to the fixed structure and has an upwardly moveable plunger 222. The end of plunger 222 fits into recess 205 in platen carriage 200 when the platen is properly registered.

In operation, photodetector 212, upon sensing the passage of pin 215 into its optical path, generates an electrical signal which is used to energize solenoid 220 and drive plunger 222 into recess 205. In this fashion, platen 32 is locked in proper registration. This position is seen in FIG. 8a.

When it is desired to change the master, solenoid 220 is deenergized, thereby releasing carriage 200. In the locked position of FIG. 8a, spring 211 is somewhat compressed. When carriage 200 is released, spring 211 urges it away from its registered position. The operator can then pull the carriage the remaining distance in order to replace the master.

A further related aspect of the invention provides an improved mechanism for clamping the master in precise registration with the platen.

An elongated clamping plate 240 extends away from an edge of platen 32 and is fastened to carriage 200 at its end remote from platen 32. The end of clamping plate 240 at the edge of platen 32 carries a retaining strip 245 which overlaps the edge of platen 32. In normal operation, strip 245 is biased towards platen 32 by the action of clamping plate 240.

Figure 9A:
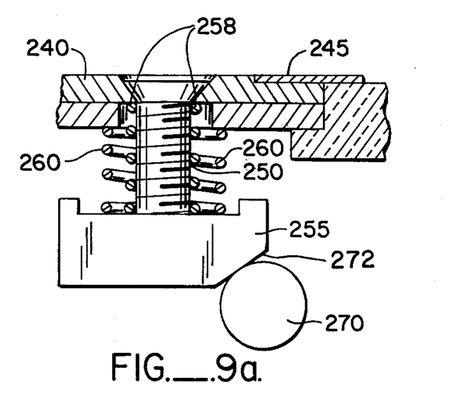
FIG. 9a is a sectional view of a first embodiment of the master retaining mechanism.
Figure 9B:
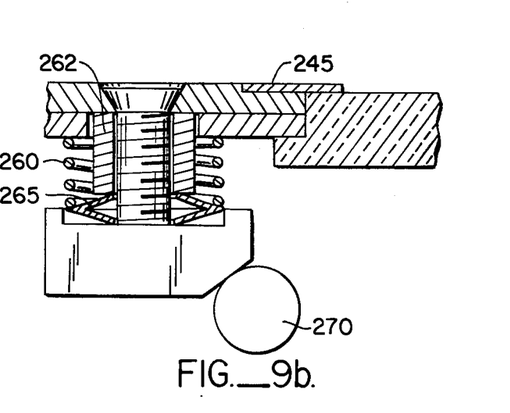
FIG. 9b is a sectional view of a second embodiment of the master retaining mechanism.

As can be seen in FIGS. 8b, 9a, and 9b, an elongated threaded bolt 250 extends through plate 240 and engages a ramp block 255. Two coaxial spring mechanism are supplied. An inner coil spring 258 biases ramp block 255 away from clamping plate 240. An outer coil spring 260 biases ramp block 255 away from carriage frame 200. An alternate embodiment, shown in FIG. 9b replaces inner coil spring 258 with a sleeve 262 and a double Belleville spring 265.

A roller 270 is mounted to the fixed structure, and is positioned to engage ramp block 255 when the platen carriage is fully withdrawn for master replacement. When the carriage is moved into its loading position, the sloped surface 272 of ramp block 255 rides up on roller 270, and pushes the block, and therewith bolt 250 upwardly. This displacement causes the inner spring 258 to displace clamping plate 240 upwardly and space strip 245 from the platen. Master fiche removal and replacement can be effected. When the platen is moved away from the loading position, ramp block 255 is disengaged from roller 270, and outer spring 260 pushes ramp block 255 downward, pulling clamping plate 240 and retaining strip 245 against the platen. Pressure exerted by retaining strip 245 can be adjusted by turning screw 250. Pressure will be greater as the screw is turned to bring ramp block 255 closer to the clamping plate (i.e. by tightening screw 250).

The operation of the duplicator should now be clear. Carriage 200 is pulled out to the loading position, so that retaining strip 245 is spaced from platen 32. The desired master fiche is placed on the upper surface of platen 32 with an edge under retaining strip 245. Carriage 200 is moved away from the loading position, whereupon retaining strip 245 clamps the master to platen 32. Carriage 200 is pushed until depending member 202 on carriage 200 displaces plunger 210 to provide an optical interruption signal. This signal causes the activation of solenoid 220 to lock the platen with the master fiche in place at exposure station 14. During this part of the operation, it is assumed that cover 37 is in its upper position to allow a movement of the platen in and out of the exposure station.

Initiation of the cycle occurs by the operator's pressing an initiation switch (not separately shown in the drawings) which first energizes motor 65 to rotate rotatable element 70 sufficiently far to lower cover 37 and bias copy film against the master. The motor is temporarily stopped, and lamp 45 is energized in whatever manner or for whatever duration is required. The copy cycle continues by energizing motor 65 for the remainder of the rotation, during which the biasing is released, the film is advanced, and the just exposed segment severed and sent for processing, as described in detail above.

I claim:

1. In a film duplicator for making copies of a microfiche master, the duplicator having an exposure station, means for indexing the master at the exposure station, and means for storing a supply of copy film, the improvement comprising:

a rotatable element having camming means associated therewith;

motor means for driving the rotatable element in a predetermined direction;

means operatively coupled to the rotatable element for advancing copy film from the supply to the exposure station during a first portion of the rotatable element's rotation;

means operatively coupled to camming means of the rotatable element for severing an exposed length of copy film during a second portion of the rotatable element's rotation, the second portion being completely distinct from the first portion; and means operatively coupled to camming means of the rotatable element for biasing the copy film in an overlying relationship into intimate contact with the master during a third portion of the rotatable element's rotation and for releasing the copy film during a fourth portion of the element's rotation;

whereby activation of the motor means causes a cyclical film transport, film severance, film biasing, and film release.

2. The invention of claim 1 wherein the master indexing means includes a transparent platen supporting the master at the exposure station, and means for holding an edge of the master to the platen for preventing relative movement therebetween while at the exposure station, and wherein the biasing and releasing means comprises:

a cover overlying the exposure station;

a resilient pad mounted to the underside of the cover;

the cover being movable into a first position wherein the pad is free of the copy film and into a second position wherein the pad biases the copy film against the master;

actuator means for moving the hinged cover between its first and second positions;

a cam surface on the rotatable element;

cam follower means confronting the cam surface; and means coupling the cam follower means to the actuator means wherein the actuator means moves the cover into its second position when the cam follower means contacts the cam surface during the third portion of the rotatable element's rotation.

3. The invention of claim 2 also comprising spring means urging the cover toward its second position, such that the actuator means counteracts the spring means in order to move the cover to its first position.

4. The invention of claim 1 wherein the means for severing the film comprises:

a first blade having its cutting edge transverse to the direction of film travel;

a second blade having its cutting edge transverse to the direction of film travel and movable relative to the first blade, the second blade having a first non-engaged position relative to the first blade wherein a clear space between the blades is provided, and a second engaged position relative to the first blade such that movement of the second blade from the first position to the second position causes severance of a piece of film occupying the clear space between the blades;

actuator means for moving the second blade from the first position to the second position;

a cam surface on the rotatable element;

cam follower means confronting the cam surface; and means coupling the cam follower means to the actuator means wherein the actuator means moves the second blade into its second position when the cam follower means contacts the cam surface during the second portion of the rotatable element's rotation.

5. The invention of claim 1 wherein the means for advancing the film comprises:

a first roller;

a second roller biased toward the first roller;

the first and second rollers adapted to capture a length of copy film therebetween to effect movement of the film upon rotation of the first roller;

a star wheel;

means coupling the star wheel and the first roller such that rotation of the star wheel imparts rotation to the first roller;

a pin mounted to the rotatable element, the pin being engageable with the star wheel such that rotation is imparted to the star wheel during the first portion of the rotatable element's rotation;

whereby the first roller is caused to rotate and thus transport the copy film during the first portion of the rotatable element's rotation.

6. The invention of claim 5 wherein the biasing and releasing means and the severing means together comprise:

a cover overlying the exposure station;

a resilient pad mounted to the underside of the cover;

the cover being movable into a first position wherein the pad is free of the copy film and into a second position wherein the pad contacts the copy film and biases it against the master;

a stationary blade having its cutting edge transverse to the direction of travel;

a movable blade having its cutting edge transverse to the direction of film travel and movable relative to the stationary blade, the movable blade having a first non-engaged position wherein a clear space between the blades is provided, and a second engaged position such that movement of the movable blade from its first position to its second position causes a piece of film between the blades to be cut;

a first cam surface on the rotatable element;

a second cam surface on the rotatable element;

a third cam surface on the rotatable element;

an actuating element operatively coupled to the cover and to the movable blade, the actuating element having a first position in which the cover is in its first position and the blade is in its first position, a second position in which the blade is in its second position, and a third position in which the cover is in its second position;

cam follower means adapted to confront the first, second and third surfaces, and means coupling the cam follower means to the actuating element such that the actuating element is moved to its first, second, or third position when the cam follower means confronts the first, second, or third cam surface, respectively, during the rotatable element's rotation.

7. The invention of claim 6 wherein the first, second, and third cam surfaces are disposed sequentially on the rotatable element such that rotation of the rotatable element causes the cam follower means to sequentially confront the first, second, and third cam surfaces, thereby causing cyclical film transport, film severance, and film biasing.

8. In a film duplicator for making copies of a master, the duplicator including an exposure station, means for storing a supply of copy film, means for advancing copy film from the supply to the exposure station, and means for severing an exposed length of copy film, the improvement comprising:

a transport platen adapted to receive the master;

a carriage having the transparent platen mounted thereto, the carriage being movable between a first position wherein the platen is at the exposure station, and a second position wherein the platen is remote from the exposure station and accessible to an operator for replacing the master;

means including a biased clamping member for holding an edge of the master to the platen, the edge holding means being operable to release the clamping member when the carriage is at its second position; and optical means for detecting movement of the carriage into its first position and solenoid means for locking the carriage in its first position.

9. The invention of claim 8 wherein the detecting and locking means comprises:

an optical interruption detector for generating a signal when optical interruption is detected;

an optical interrupter, the detector and interrupter being relatively movable into operative engagement such that interruption occurs when the carriage assumes its first position;

a solenoid having a plunger movable between first and second positions;

cooperating locking means on the carriage engageable with the plunger for preventing carriage movement when the plunger is in its second position, and for allowing carriage movement when the plunger is in its first position; and means responsive to the signal from the optical interruption detector for actuating the solenoid to cause the plunger to move from its first to its second position.

10. The invention of claim 9 also comprising:

spring biasing means for urging the carriage away from its first position, such that movement of the plunger from its second position to its first position releases the carriage whereby the spring means causes the carriage to move from its first position toward its second position.

11. The invention of claim 8 wherein the means for holding an edge of the master to the platen comprises:

a flat, somewhat resilient strip overlying an edge of the platen;

biasing means for urging the strip against the platen; and opening means coupled to the strip for urging the strip in opposition to the biasing means when the carriage is in its second position; such that the strip is separated from the platen by a distance at least as great as the thickness of the master.

12. The invention of claim 11 wherein the opening means comprises:

a rotatable bearing having a fixed position relative to the exposure station;

a ramp block coupled to the carriage and the strip;

wherein the ramp block is deflected by the bearing when the carriage moves toward its second position to urge the strip away from the platen.

13. In a film duplicator for making copies of a master, the duplicator having an exposure station, means for storing a supply of copy film, and means for advancing copy film from the supply to the exposure station, improved means for releasing a portion of film from the supply in response to film advancement, comprising:

a rotatable shaft adapted to receive the supply of film in the form of a roll disposed coaxially with respect to the shaft;

guide means remote from the roll of film defining a length of film between the roll of film and the guide means;

movable tension means between the roll of film and the guide means for maintaining a predetemined tension in the length of film, the tension means being biased in a first direction and movable in the first direction in response to a decrease in tension, and being movable in a second opposite direction in response to an increase in tension;

brake means engageable with the shaft to inhibit rotation thereof;

means coupling the tension means and the brake means such that movement of the tension means in its first direction engages the brake means, and movement of the tension means in its second direction releases the brake means;

such that advancement of the film causes sequential increase in tension, movement of the tension means in its second direction, release of the brake means, unwinding of the film in response to the biasing of the tension means in its first direction, and engagement of the brake means.

14. The invention of claim 13 wherein the tension means includes a tension roller downwardly biased by gravity, and wherein the means coupling the tension means to the brake means includes an obliquely depending arm supporting the tension roller, such that advancement of the film causes the tension roller to be moved upward, the arm being operative to release the brake means upon such upward movement.

15. The invention of claim 14 also comprising means for detecting movement of the arm corresponding to an elevation of the tension roller above a maximum height, the movement above the maximum height occurring when the roll of film is unable to unwind from the shaft.

16. The invention of claim 14 also including means for detecting movement of the arm corresponding to a position of the tension roller below a minimum height, the movement of the tension roller below the minimum height occurring when the end of the roll of film is detached from the shaft.

17. In a film duplicator for making copies of a microfiche master, the duplicator including an exposure station, means for storing a supply of copy film, means for advancing copy film from the supply to the exposure station, means for indexing the master at the exposure station, and means for severing an exposed length of copy film, the improvement comprising:

a rotatable element having a peripheral surface defining a cam;

motor means for driving the rotatable element in a predetermined direction;

means defining a Geneva drive coupling the rotatable element to the film advancement means during a first portion of the rotatable element's rotation;

a cam follower contacting the peripheral surface of the rotatable element;

the cam having a first level cam surface defined by a constant radius wherein the cam follower contacts the first cam surface during the first portion of the rotatable element's rotation, a second inclined cam surface defined by an increasing radius along the sense of rotation, a third cam surface defined by a further increasing radius, and a fourth cam surface defined by a decreasing radius;

wherein the cam follower contacts the first, second third, and fourth cam surfaces sequentially as the rotatable element rotates;

a cover overlying the exposure station;

a resilient pad mounted to the underside of the cover, the cover being movable into a first position wherein the pad is free of the copy film and into a second position wherein the pad biases the copy film against the master;

a stationary blade immediately downstream of the exposure station, a movable blade engageable with the stationary blade having a first position wherein a clear space is provided between the blades, and a second position such that movement of the movable blade from the first position to the second position causes severence of a piece of film occupying the clear space between the blades;

an actuator coupled to the hinged cover and to the movable blade, the actuator having a first position in which the cover is in its first position and the movable blade is in its first position, a second position in which the movable blade is in its second position, and a third position in which the cover is in its second position;

a rocker arm coupled between the cam follower and the actuator such that the actuator assumes its first, second, or third position when the cam follower contacts the first, second or third cam surface respectively during the rotatable element's rotation;

a transparent platen adapted to receive the master;

a carriage having the platen mounted thereto, the carriage being movable between a first position wherein the platen is at the exposure station and a second position wherein the platen is remote from the exposure station;

means for detecting movement of the carriage into its first position and for locking the carriage in its first position;

a flat somewhat resilient strip overlying an edge of the platen;

biasing means for urging the strip against the platen;

means coupled to the strip for urging the strip in opposition to the biasing means when the carriage is in its second position, to allow replacement of the master;

a rotatable shaft adapted to receive the supply of film in the form of a roll disposed coaxially with respect to the shaft;

a deflection roller remote from the roll of film defining a length of film between the roll of film and the deflection roller;

a tension roller biased against the length of film in a first direction and movable in the first direction in response to a decrease in tension, and movable in a second opposite direction in response to an increase in tension;

a brake engageable with the shaft to inhibit rotation thereof;

an arm supporting the tension roller and coupled to the brake such that movement of the tension roller in its first direction engages the brake and movement of the tension roller in its second direction releases the brake;

such that advancement of the film causes sequential increase in tension, movement of the tension roller in its second direction, release of the brake, unwinding of the film in response to biasing of the tension roller in its first direction, and engagement of the brake; and means coupled to the tension roller support arm for detecting movement of the arm outside predetermined limits whereby the end of the roll of film is detected.

18. A duplicator for making copies from a microform master positioned at an exposure station, comprising a supply of copy film;

drive means;

driven means connected with said drive means and having a camming surface thereon;

means connected with said driven means for advancing said copy film to said exposure station during a first portion of rotation of said driven means, means operably connected with said camming surface for severing a length of copy film during a second portion of rotation of said driven means, means operably connected with said camming surface for biasing the severed copy film into contact with the microform master during a third portion of rotation of said driven means, and means operably connected with said camming surface for releasing the film copy during a fourth portion of rotation of said driven means whereby actuation of the drive means causes cyclical film advancement, film severance, film biasing, and film release.

19. The duplicator of claim 18 wherein said driven means comprises a rotatable element having a plurality of camming portions therein and cam follower means engaging said portions during a cycle of duplicating operation.

20. The duplicator of claim 18 including actuator means connected with said severing means and with said biasing means and actuated during the second, third and fourth portions of rotation.

* * * * *